(12) United States Patent
Yang

(10) Patent No.: US 11,969,611 B2
(45) Date of Patent: Apr. 30, 2024

(54) FACE MASK WITH SUPPORTING STRIP

(71) Applicant: Chin-Lung Yang, Kaohsiung (TW)

(72) Inventor: Chin-Lung Yang, Kaohsiung (TW)

( * ) Notice: Subject to any disclaimer, the term of this patent is extended or adjusted under 35 U.S.C. 154(b) by 503 days.

(21) Appl. No.: 16/950,939

(22) Filed: Nov. 18, 2020

(65) Prior Publication Data

US 2021/0162243 A1 Jun. 3, 2021

(30) Foreign Application Priority Data

Nov. 28, 2019 (TW) ................................ 108215793
Feb. 4, 2020 (TW) ................................ 109201232
Oct. 13, 2020 (TW) ................................ 109135403

(51) Int. Cl.
| | | |
|---|---|---|
| *A62B 18/02* | (2006.01) | |
| *A41D 13/11* | (2006.01) | |
| *A41D 31/10* | (2019.01) | |
| *A41D 31/12* | (2019.01) | |
| *A62B 18/08* | (2006.01) | |
| *A62B 23/02* | (2006.01) | |
| *B32B 5/02* | (2006.01) | |
| *B32B 7/12* | (2006.01) | |

(52) U.S. Cl.
CPC ........ *A62B 18/025* (2013.01); *A41D 13/1115* (2013.01); *A41D 13/1161* (2013.01); *A41D 31/10* (2019.02); *A41D 31/12* (2019.02); *A62B 18/084* (2013.01); *A62B 23/025* (2013.01); *B32B 5/022* (2013.01); *B32B 7/12* (2013.01); *B32B 2571/00* (2013.01)

(58) Field of Classification Search
CPC ...... A62B 23/00–025; A62B 18/00–10; A41D 13/11–1192; A41D 31/00–325; B32B 5/02; B32B 5/022; B32B 7/00; B32B 7/04; B32B 7/12; B32B 7/14; B32B 2571/00
See application file for complete search history.

(56) References Cited

U.S. PATENT DOCUMENTS

| | | |
|---|---|---|
| 3,802,429 A | 4/1974 | Bird |
| 3,985,132 A | 10/1976 | Boyce et al. |
| 6,070,578 A * | 6/2000 | Baughman ......... A41D 13/1192 128/205.27 |

(Continued)

FOREIGN PATENT DOCUMENTS

| | | |
|---|---|---|
| CN | 2661234 Y | 12/2004 |
| CN | 204838104 U | 12/2015 |

(Continued)

*Primary Examiner* — Michelle J Lee
(74) *Attorney, Agent, or Firm* — WPAT, PC

(57) ABSTRACT

A face mask has a mask body, at least one supporting strip, and two ear loops. The mask body has a top edge and a bottom edge disposed opposite each other, and has two lateral edges disposed opposite each other. Each one of the at least one supporting strip is elongated, is bendable, is disposed at a middle position on the mask body, and extends toward the two lateral edges. The two ear loops are respectively connected to the two lateral edges of the mask body. The at least one supporting strip holds up the mask body to form a space between the mask body and the wearer's face. The at least one supporting strip keeps the mask body from collapsing, and keeps the mask body from contacting the wearer's face during breathing.

10 Claims, 19 Drawing Sheets

(56) References Cited

U.S. PATENT DOCUMENTS

| | | | |
|---|---|---|---|
| 6,752,753 B1 | 6/2004 | Hoskins et al. | |
| 7,036,507 B2 * | 5/2006 | Jensen | A41D 13/1115 128/206.13 |
| 7,290,545 B2 | 11/2007 | Kleman et al. | |
| 2005/0098180 A1 | 5/2005 | Lien | |
| 2005/0133034 A1 | 6/2005 | Jensen | |
| 2006/0130841 A1 * | 6/2006 | Spence | A41D 13/1107 128/206.19 |
| 2011/0271955 A1 * | 11/2011 | Palomo | A41D 13/1115 128/206.16 |
| 2015/0306432 A1 | 10/2015 | Orofino | |
| 2018/0160749 A1 | 6/2018 | Kim | |
| 2020/0163392 A1 | 5/2020 | Sakurai | |

FOREIGN PATENT DOCUMENTS

| | | |
|---|---|---|
| CN | 204908033 | 12/2015 |
| CN | 207202123 | 4/2018 |
| CN | 208550098 U | 3/2019 |
| DE | 8905261 | 8/1989 |
| EP | 0894443 A2 | 2/1999 |
| GB | 0929240 B1 * | 10/2002 |
| JP | H8-155046 A | 6/1996 |
| JP | H11-99216 A | 4/1999 |
| JP | 2006333972 A * | 12/2006 |
| JP | 3161074 U | 7/2010 |
| JP | 2011-36574 A | 2/2011 |
| JP | 2012-187332 A | 10/2012 |
| JP | 2016059780 A | 4/2016 |
| JP | 2018-95981 A | 6/2018 |
| JP | 3220304 U | 2/2019 |
| JP | 3222972 U | 9/2019 |
| KR | 10-2016-0057948 | 5/2016 |
| KR | 10-1869654 | 6/2018 |
| KR | 10-2019-0097388 | 8/2019 |
| RU | 2654 400 C1 | 5/2018 |
| RU | 182435 U1 | 8/2018 |
| TW | M580436 | 7/2019 |
| TW | M593267 | 4/2020 |
| TW | M599176 | 8/2020 |
| WO | WO97/46123 | 12/1997 |
| WO | WO2011/163002 A2 | 12/2011 |
| WO | WO2012/030798 A1 | 3/2012 |
| WO | 2018/180414 A1 | 10/2018 |

* cited by examiner

FACE MASK WITH SUPPORTING STRIP

BACKGROUND OF THE INVENTION

1. Field of the Invention

The present invention relates to a face mask, and more particularly to a face mask having at least one supporting strip to hold up a mask body of the face mask.

2. Description of Related Art

With the increasing awareness of fitness and health care, nowadays people actively participate in outdoor sports, relieving their intense pressure and maintaining their energy and health by exercising outdoors. However, the problem of air pollution is getting worse year by year, so some people exercising outdoors wear face masks to prevent air pollution from negatively affecting their health. As shown in FIG. 19, a conventional face mask 90 includes a mask body 91, two ear loops 92, and a nose clip 93. The mask body 91 has multiple pleats. The pleats make the mask body 91 folded up and down. The two ear loops 92 are arranged on two lateral edges of the mask body 91. The nose clip 93 is disposed at the mask body 91 and is disposed adjacent to a top edge of the mask body 91. A wearer hangs the two ear loops 92 of the face mask 90 on their left and right ears and let the nose clip 93 adjacent to the top edge of the mask body 91 contact a nose bridge of the wearer. The wearer bends the nose clip 93 to fit their nose bridge. The top edge of the mask body 91 is attached to the wearer's face accordingly. When the wearer breathes, air outside the face mask 90 passes through the mask body 91 and enters the wearer's nose. The face mask 90 is able to block pollutants in the air.

Nevertheless, as shown in FIG. 19, when the wearer wears the face mask 90 and exercises outdoors, the wearer frequently exhales and inhales during exercising. The mask body 91 inward contacts the wearer's mouth and skin lower than the wearer's nose when the wearer inhales. The mask body 91 outward departs from the wearer's mouth and skin lower than the wearer's nose when the wearer exhales. The face mask 90 repeatedly contacts and departs from the wearer, such that saliva, sweat, breath vapor, or makeup is attached to the face mask 90, which makes the wearer uncomfortable.

To overcome the shortcomings of the conventional face mask, the present invention provides a face mask with at least one supporting strip to mitigate or obviate the aforementioned problems.

SUMMARY OF THE INVENTION

The main objective of the present invention is to provide a face mask that provides comfortable wearing experience.

The face mask has a mask body, at least one supporting strip, and two ear loops. The mask body has a top edge and a bottom edge disposed opposite each other, and has two lateral edges disposed opposite each other. Each one of the at least one supporting strip is elongated, is bendable, is disposed at a middle position on the mask body, and extends toward the two lateral edges. The two ear loops are respectively connected to the two lateral edges of the mask body. The at least one supporting strip holds up the mask body to form a space between the mask body and the wearer's face. The at least one supporting strip keeps the mask body from collapsing, and keeps the mask body from contacting the wearer's face during breathing.

The mask body further has a first pleat, a second pleat, and a third pleat. The second pleat has an exterior sheet, an interior sheet, and a bending section connected to both the exterior sheet and the interior sheet of the first pleat. The at least supporting strip includes two supporting strips both disposed at the exterior sheet of the second pleat. Furthermore, the face mask of the present invention may further have an additional supporting strip disposed at the second pleat or may further have an auxiliary disposed at the third pleat.

Benefits of the present invention are:
1. The supporting strips disposed at the middle portion of the mask body support the mask body simultaneously, maintain a shape of the mask body, and sustain a space between the mask body and a wearer's face. The supporting strips keep the mask body from collapsing and contacting the mouth and the skin below the nose of the wearer. The supporting strips promote wearing comfort of the face mask of the present invention, and let the wearer always breathe smoothly.
2. The two supporting strips are both disposed at the second pleat. A distance defined between the two supporting strips is short. Therefore, a part of the mask body disposed between the two supporting strips can be sufficiently supported, be expanded, and be free from collapsing. When the wearer is speaking as wearing the face mask of the present invention, the part of the mask body disposed between the two supporting strips is not easy to be depressed toward the wearer's face, and shows a smooth appearance.
3. The two supporting strips are both disposed at the second pleat. The part of the mask body disposed between the two supporting strips is free from any folding structures. Therefore, the second pleat of the mask body can show a smooth appearance when worn on the wearer's face.
4. The face mask of the present invention further has the additional supporting strip disposed at the second pleat or further has the auxiliary supporting strip disposed at the third pleat. One of the supporting strips is disposed between a lower rim of the wearer's nose and the upper lip of the wearer. Another supporting strip is disposed between the upper lip and the lower lip of the wearer. The additional supporting strip or the auxiliary supporting strip is disposed between the lower lip and the chin of the wearer and further enhances rigidity of the second pleat.

Other objects, advantages, and novel features of the invention will become more apparent from the following detailed description when taken in conjunction with the accompanying drawings.

DETAILED DESCRIPTION OF PREFERRED EMBODIMENTS

Figure 1:
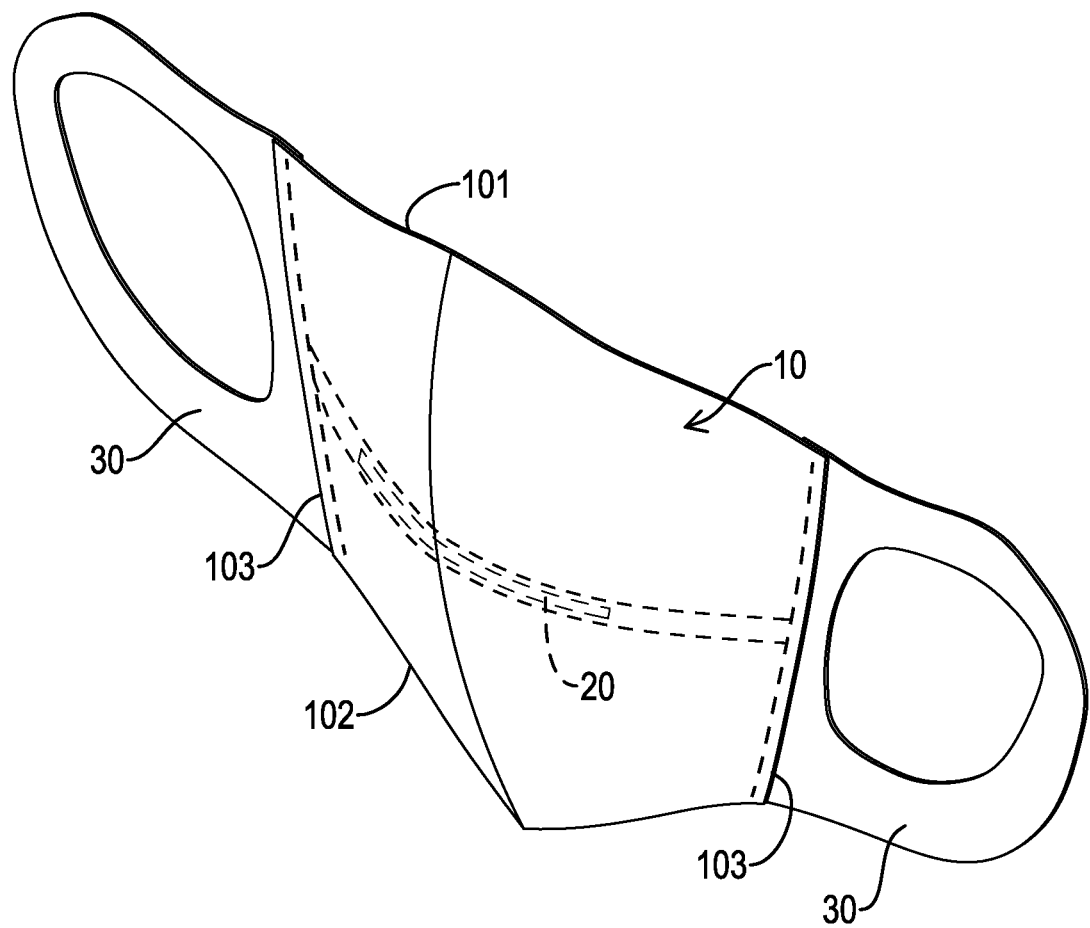
FIG. 1 is a perspective view of a first embodiment of a face mask in accordance with the present invention.
Figure 2:
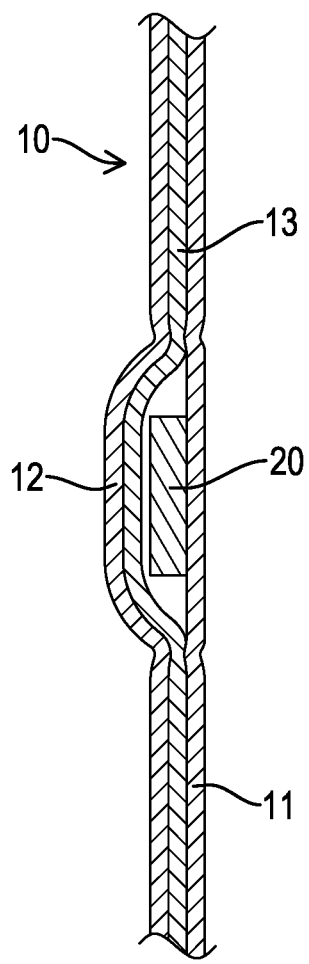
FIG. 2 is an enlarged cross-sectional side view of the face mask in FIG. 1.

With reference to FIGS. 1 and 2, a first embodiment of a face mask in accordance with the present invention is a three-dimensional face mask (respirator) and has a mask body 10, at least one supporting strip 20, and two ear loops 30. The mask body 10 is cup-shaped when expanded and has a top edge 101 and a bottom edge 102 disposed opposite each other, and has two lateral edges 103 parallel to and opposite each other. The mask body 10 has an absorbent layer 11, an impermeable layer 12, and a filter layer 13.

The absorbent layer 11 has an outer surface and an inner surface facing opposite directions. The absorbent layer 11 is made of water absorption materials, is soft, and is configured to absorb bodily fluid of a wearer such as saliva, sweat, and breath vapor. The impermeable layer 12 is made of water repellent materials, is stiffer than the absorbent layer 11, and is able to prevent attachment of droplet or blood. The filter layer 13 is disposed between the absorbent layer 11 and the impermeable layer 12, and the inner surface of the absorbent layer 11 faces to the filter layer 13.

With reference to FIGS. 1 and 2, in the first embodiment, the at least one supporting strip 20 includes one supporting strip 20. The supporting strip 20 is bendable, is elongated, and extends toward the two lateral edges 103 of the mask body 10. Two ends of the supporting strip 20 are respectively apart from the two lateral edges 103 of the mask body 10. The supporting strip 20 is disposed between the absorbent layer 11 and the filter layer 13 and is disposed at a middle position on the mask body 10. The two ear loops 30 are respectively connected to the two lateral edges 103 of the mask body 10.

Figure 3:
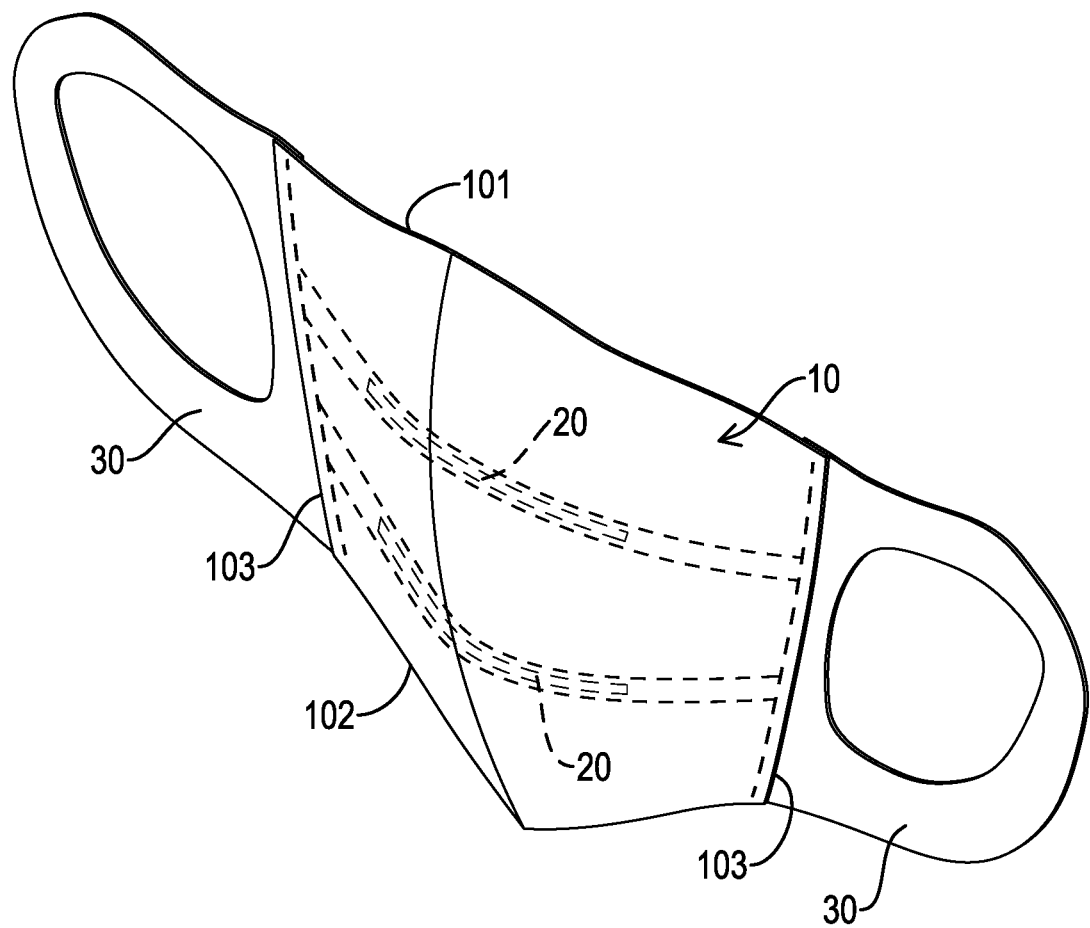
FIG. 3 is a perspective view of a second embodiment of the face mask in accordance with the present invention.

With reference to FIG. 3, a second embodiment of the face mask in accordance with the present invention is also a three-dimensional face mask (respirator). In the second embodiment, the at least one supporting strip 20 includes two supporting strips 20. Each supporting strip 20 extends toward the two lateral edges 103 of the mask body 10. The two supporting strips 20 are parallel to each other and are disposed at the middle position on the mask body 10 corresponding to positions of an upper lip and a lower lip of the wearer. Specifically, the two supporting strips 20 divide a distance defined between the top edge 101 and the bottom edge 102 of the mask body 10 into three sections. More specifically, the two supporting strips 20 divide the distance between the top edge 101 and the bottom edge 102 of the mask body 10 into three equal sections.

In the present invention, the absorbent layer 11, the impermeable layer 12, and the filter layer 13 are integrally welded together. Surroundings of each supporting strip 20 are welded to fix the supporting strip 20. The two supporting strips 20 are kept at the middle position on the mask body 10 accordingly and are unable to be moved relative to the mask body 10. The two supporting strips 20 are disposed between the absorbent layer 11 and the filter layer 13, the two supporting strips 20 are able to hold up the absorbent layer 11, the impermeable layer 12, and the filter layer 13 simultaneously as the two supporting strips 20 are being bended. Therefore, the mask body 10 can be fully sustained in expansion and be free from a situation that only the absorbent layer 11 and the filter layer 13 are propped up.

Figure 4:
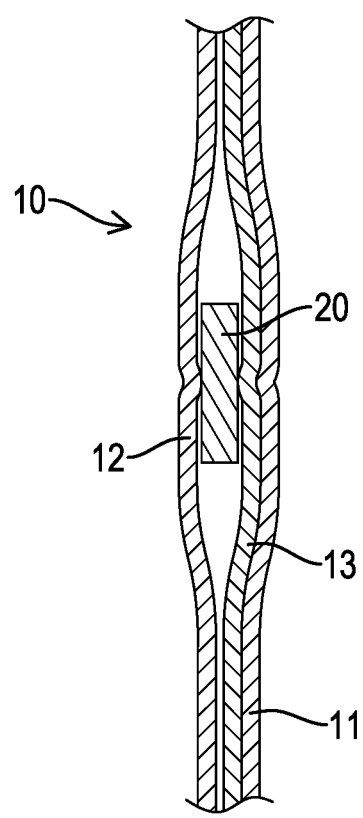
FIG. 4 is an enlarged cross-sectional side view of the face mask in accordance with the present invention.

Practically, non-toxic and eco-friendly glue is applied to adhere and to fix the two supporting strips 20 to the absorbent layer 11 and between the absorbent layer 11 and the filter layer 13. The two supporting strips 20 may be fixed to the outer face of the absorbent layer 11. As shown in FIG. 4, welding may be applied on and along each supporting strip 20 to directly fix the absorbent layer 11, the impermeable layer 12, the filter layer 13, and the two supporting strips 20. Besides retaining the two supporting strips 20 in expansion between the two lateral edges 103 of the mask body 10, the absorbent layer 11, the impermeable layer 12, or the filter layer 13 would not be sucked toward the wearer's face as the wearer is breathing because the absorbent layer 11, the impermeable layer 12, and the filter layer 13 are directly connected to the two supporting strips 20.

When the face mask of the second embodiment is worn on the wearer's face, one of the supporting strips 20 is disposed between a columella of the wearer's nose and the upper lip of the wearer, the other supporting strip 20 is disposed below the lower lip of the wearer. The two supporting strips 20 can be bended to hold up the mask body 10 and to form a space between the mask body 10 and the wearer. Bending degree of the two supporting strips 20 can be adjusted to expand the space between the mask body 10 and the wearer. The space between the mask body 10 and the wearer's face allows the wearer to keep breathing smoothly. The space between the mask body 10 and the wearer's face is not getting small when the wearer inhales, and the mask body 10 supported by the two supporting strips 20 is free from attaching to the wearer's face. The face mask of the present invention prevents the wearer's breathing difficulty.

Since the mask body 10 supported by the two supporting strips 20 is free from attaching to the wearer's face, droplets of the wearer and lipstick worn on the wearer's face are kept from attaching to the mask body 10. In addition to being more hygienic in use, the face mask of the present invention can also prolong the service life of the face mask, reduce the cost of replacing the face mask, and is beneficial to environmental protection.

Moreover, when the wearer exercises outdoors, the mask body 10 supported by the two supporting strips 20 not only keeps the wearer breathing smoothly, but also solves the problem of the conventional face mask 90 that the conventional face mask 90 contacts and leaves the wearer's face repeatedly. The mask body 10 supported by the two supporting strips 20 also prevents the mask body 10 from rubbing the wearer's face.

Figure 5:
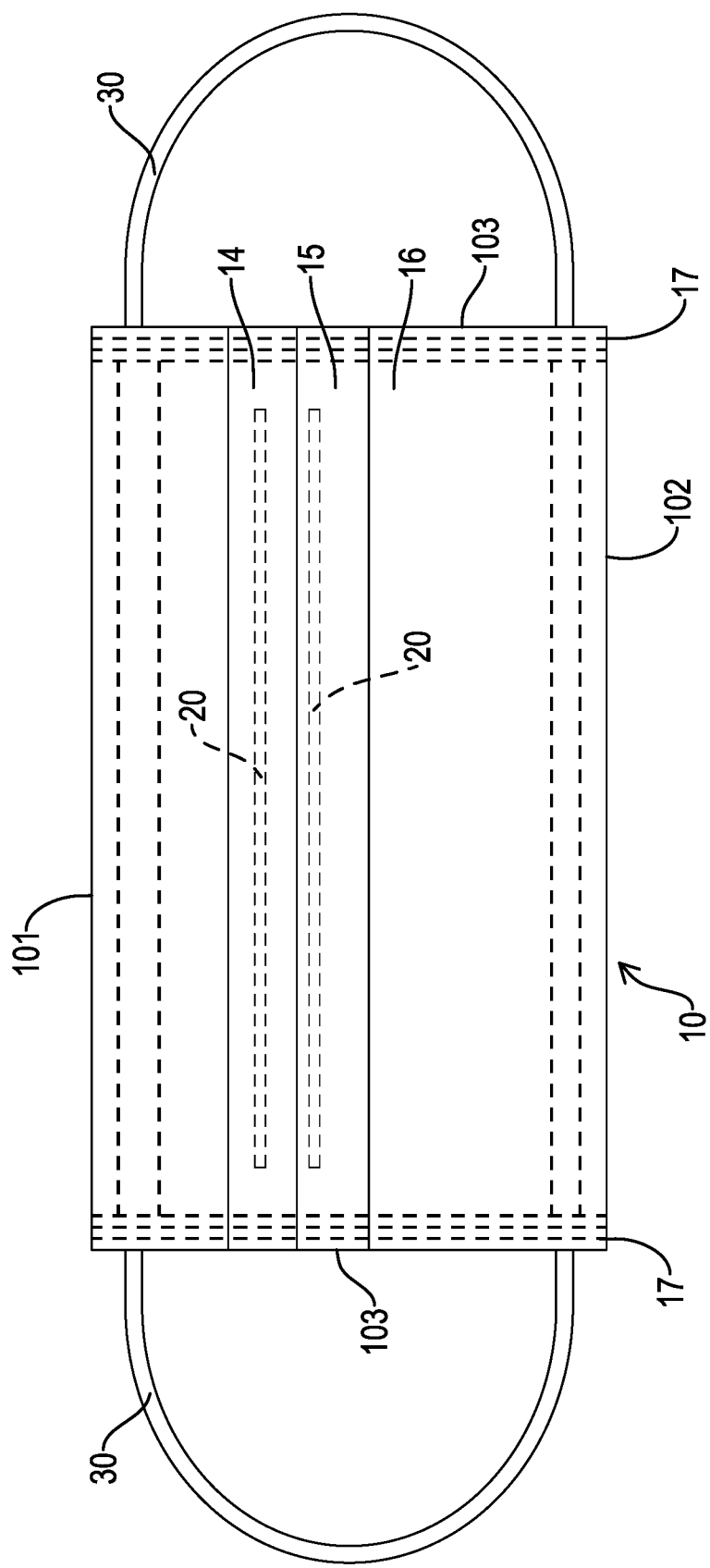
FIG. 5 is a top view of a third embodiment of the face mask in accordance with the present invention.

With reference to FIGS. 2 and 5, a third embodiment of the face mask of the present invention is a flat face mask (surgical mask). The face mask of the third embodiment also has the mask body 10, the two supporting strips 20 disposed between the absorbent layer 11 and the filter layer 13, and the two ear loops 30 respectively connected to the two lateral edges 103 of the mask body 10. Differences between the third embodiment and the second embodiment are: the mask body 10 of the third embodiment has a first pleat 14, a second pleat 15, and a third pleat 16 parallel to one another at intervals. The mask body 10 of the third embodiment further has two securements 17.

With reference to FIG. 5, the first pleat 14 is disposed adjacent to the top edge 101 of the mask body 10, the second pleat 15 is disposed lower than the first pleat 14, and the third pleat 16 is disposed lower than the second pleat 15. The two securements 17 are formed by welding and are disposed respectively adjacent to the two lateral edges 103 of the mask body 10. The two securements 17 respectively extend along the two lateral edges 103 of the mask body 10. In the third embodiment, one of the supporting strips 20 is disposed at the first pleat 14, and the other one of the supporting strips 20 is disposed at the second pleat 15.

Figure 6:
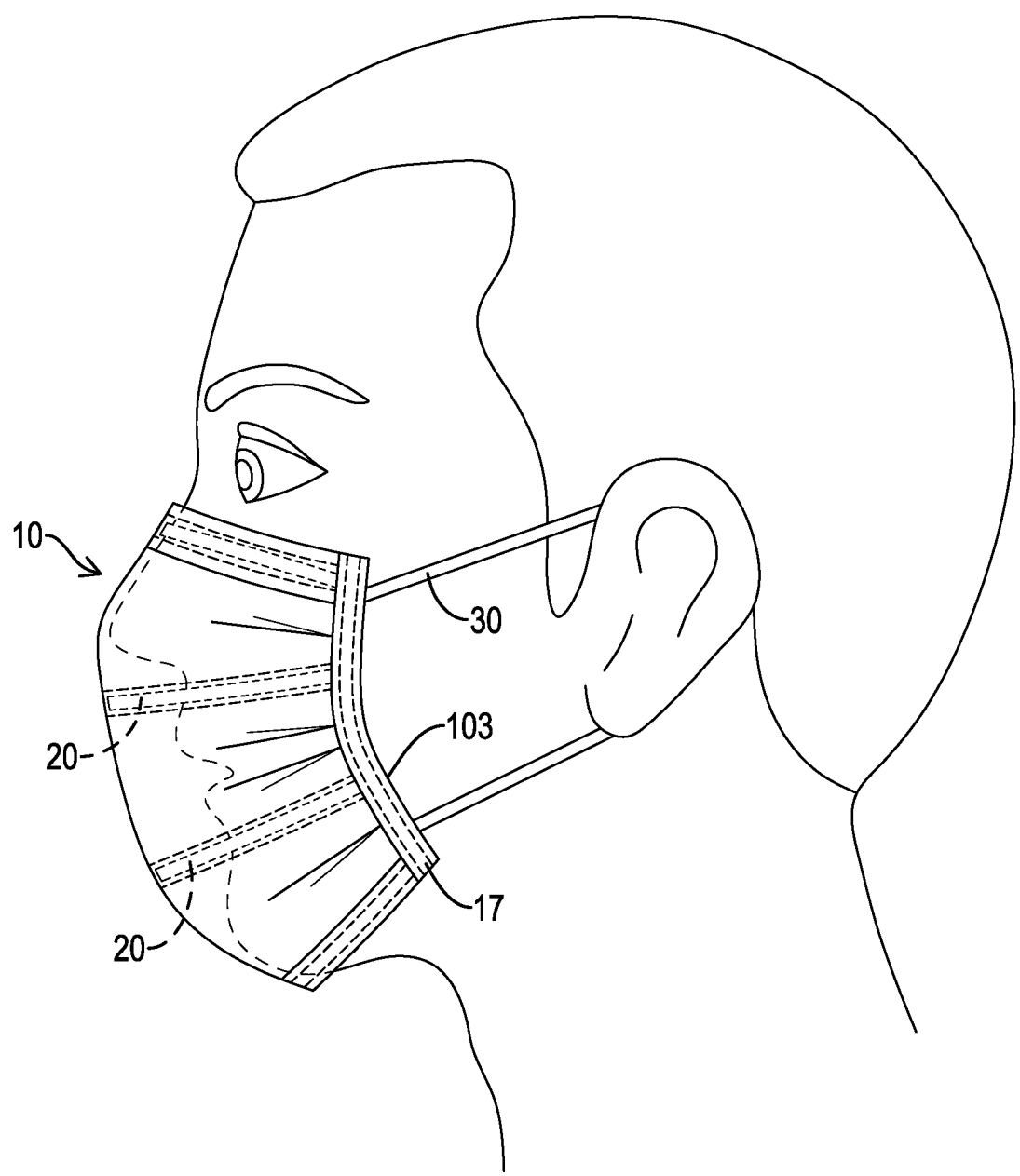
FIG. 6 is a side view of the face mask in accordance with the present invention and shows supporting strips extending to each securement.
Figure 7:
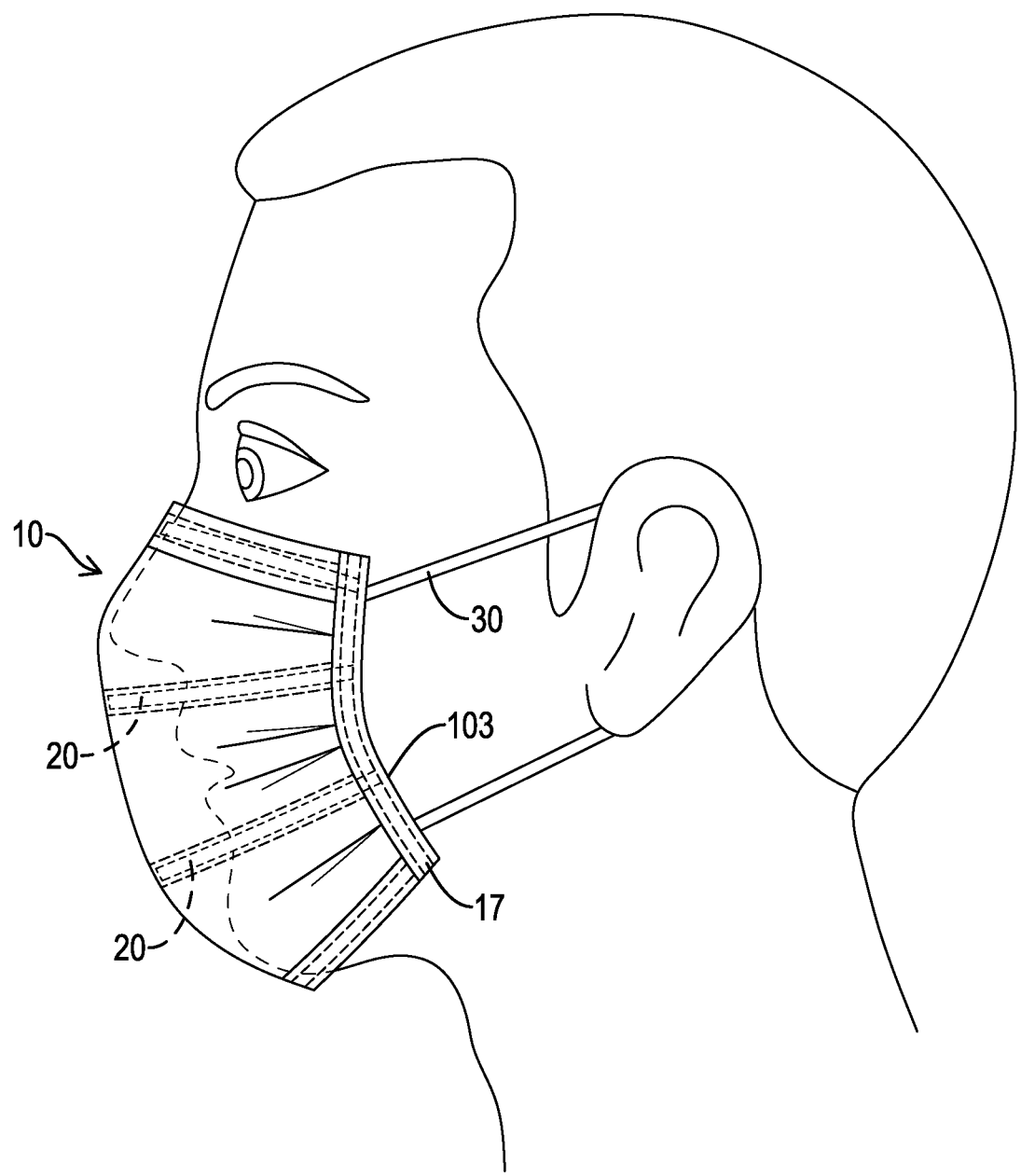
FIG. 7 is a side view of the face mask in accordance with the present invention and shows supporting strips extending through each securement.

With reference to FIG. 5, the two ends of each supporting strip 20 are respectively apart from the two securements 17. With reference to FIG. 6, the two ends of each supporting strip 20 may respectively extend to the two securements 17 as well. Otherwise, with reference to FIG. 7, the two ends of each supporting strip 20 may respectively extend through the two securements 17 and respectively extend to the two lateral edges 103 of the mask body 10. The two securements 17 formed by welding can respectively fix the two ends of each supporting strip 20. The supporting strip 20 with the two ends respectively extending to the two lateral edges 103 of the mask body 10 increases the degree of bending of the supporting strip 20. The wearer may expand the space between the mask body 10 and the wearer's face according to practical usage.

Likewise, the wearer may bend the two supporting strips 20, respectively place the two ear loops 30 to two ears of the wearer, and make the mask body 10 cover the mouth of the wearer. The second pleat 15 and one of the supporting strips 20 disposed at the second pleat 15 are disposed between the columella of the wearer's nose and the upper lip of the wearer. The third pleat 16 and the other one of the supporting strips 20 are disposed between the lower lip and a chin of the wearer. The two supporting strips 20 hold up the mask body 10 to form the space between the mask body 10 and the wearer and let the space disposed between the tip of the wearer's nose and the chin of the wearer.

When the wearer inhales, the mask body 10 supported by the two supporting strips 20 sustains the space. The mask body 10 is free from collapsing, and from contacting the mouth of the wearer and skin below the wearer's nose. The wearer also can adjust the bending degree of the two supporting strips 20 to expand the space. When the wearer exhales, the two supporting strips 20 maintain the shape of the mask body 10 and keep the mask body 10 from expanding to form a gap between the mask body 10 and the wearer. The edges of the mask body 10 securely attached to the face of the wearer and the two supporting strips 20 maintain the shape of the mask body 10. When the wearer exercises outdoors and frequently breathes, the shape of the mask body 10 remains unchanged and is free from contacting the wearer and causing discomfort of the wearer.

In addition, when the wearer breathes, the mask body 10 supported by the two supporting strips 20 maintains the shape of the mask body 10. The mask body 10 does not collapse or expand when the wearer inhales and exhales. The mask body 10 supported by the two supporting strips 20 keeps the wearer feel comfortable when wearing the face mask of the present invention. The mask body 10 is tightly attached to the wearer to fully block pollutants in the atmosphere to protect the wearer.

Furthermore, in the third preferred embodiment of the present invention, the absorbent layer 11 made of water absorption materials can also absorb bodily fluid of the wearer. The filter layer 13 can block bacteria and pollutant in the air. The impermeable layer 12 made of non-woven fabric with water repellent also prevents the wearer from droplet infection.

Figure 8:
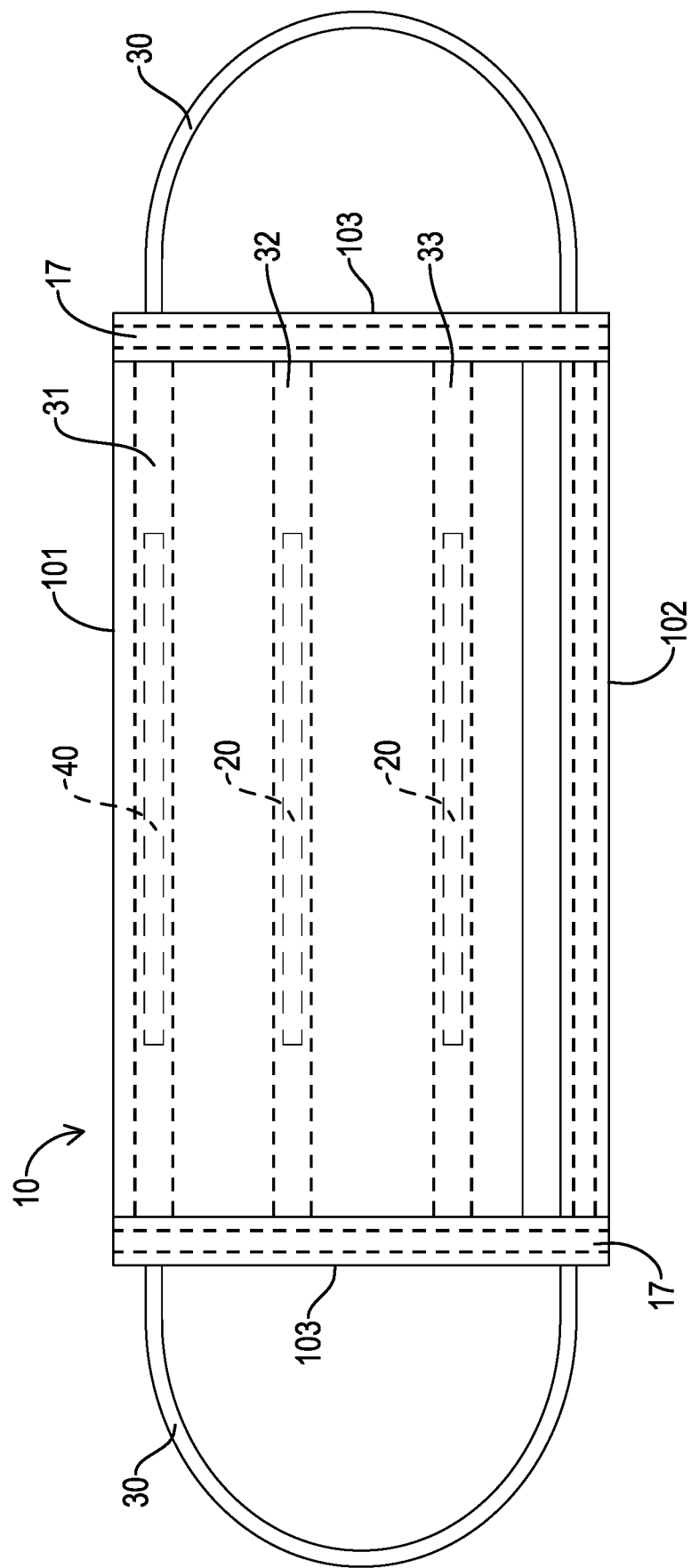
FIG. 8 is a top view of a fourth embodiment of the face mask in accordance with the present invention.

With reference to FIGS. 2 and 8, a fourth embodiment of the face mask in accordance with the present invention is also a flat face mask (surgical mask). The fourth embodiment also has a mask body 10, the two supporting strips (upper-lip strip, lower-lip strip) 20 disposed between the absorbent layer 11 and the filter layer 13, and the two ear loops 30 respectively connected to the two lateral edges 103 of the mask body 10. Differences between the fourth embodiment and the third embodiment are: the mask body 10 has a top pleat 31, an upper-lip pleat 32, and a lower-lip pleat 33. The fourth embodiment further has a nose clip (top supporting strip) 40. The top pleat 31 is disposed adjacent to the top edge 101 of the mask body 10. The upper-lip pleat 32 is disposed lower than the top pleat 31. The lower-lip pleat 33 is disposed lower than the upper-lip pleat 32. The two supporting strips (upper-lip strip, lower-lip strip) 20 are respectively disposed at the upper-lip pleat 32 and the lower-lip pleat 33. The nose clip 40 is elongated, is flexible and bendable, and is disposed adjacent to the top pleat 31. The nose clip 40 extends toward the two lateral edges 103 of the mask body 10.

With reference to FIGS. 2 and 9 to 11, a fifth embodiment of the present invention is similar to the third embodiment. The fifth embodiment also has the mask body 10, the two supporting strips 20 disposed between the absorbent layer 11 and the filter layer 13, and the two ear loops 30 respectively connected to the two lateral edges 103 of the mask body 10. Differences between the fifth embodiment and the third embodiment are: the mask body 10 in the fifth embodiment further has four fourth pleats 18. The four fourth pleats 18 are not like the first pleat 14, the second pleat 15, and the third pleat 16 that are parallel to the top edge 101 and the bottom edge 102 of the mask body 10. Instead, the four fourth pleats 18 are parallel to the two lateral edges 103 of the mask body 10. Two of the four fourth pleats 18 extend from the top edge 101 of the mask body 10 toward the bottom edge 102 of the mask body 10 and form two protrusions 181 protruding toward each other at an outer side of the absorbent layer 11. The other two of the four fourth pleats 18 extend from the bottom edge 102 of the mask body 10 toward the top edge 101 of the mask body 10 and form two protrusions 181 protruding toward each other at the outer side of the absorbent layer 11.

Figure 9:
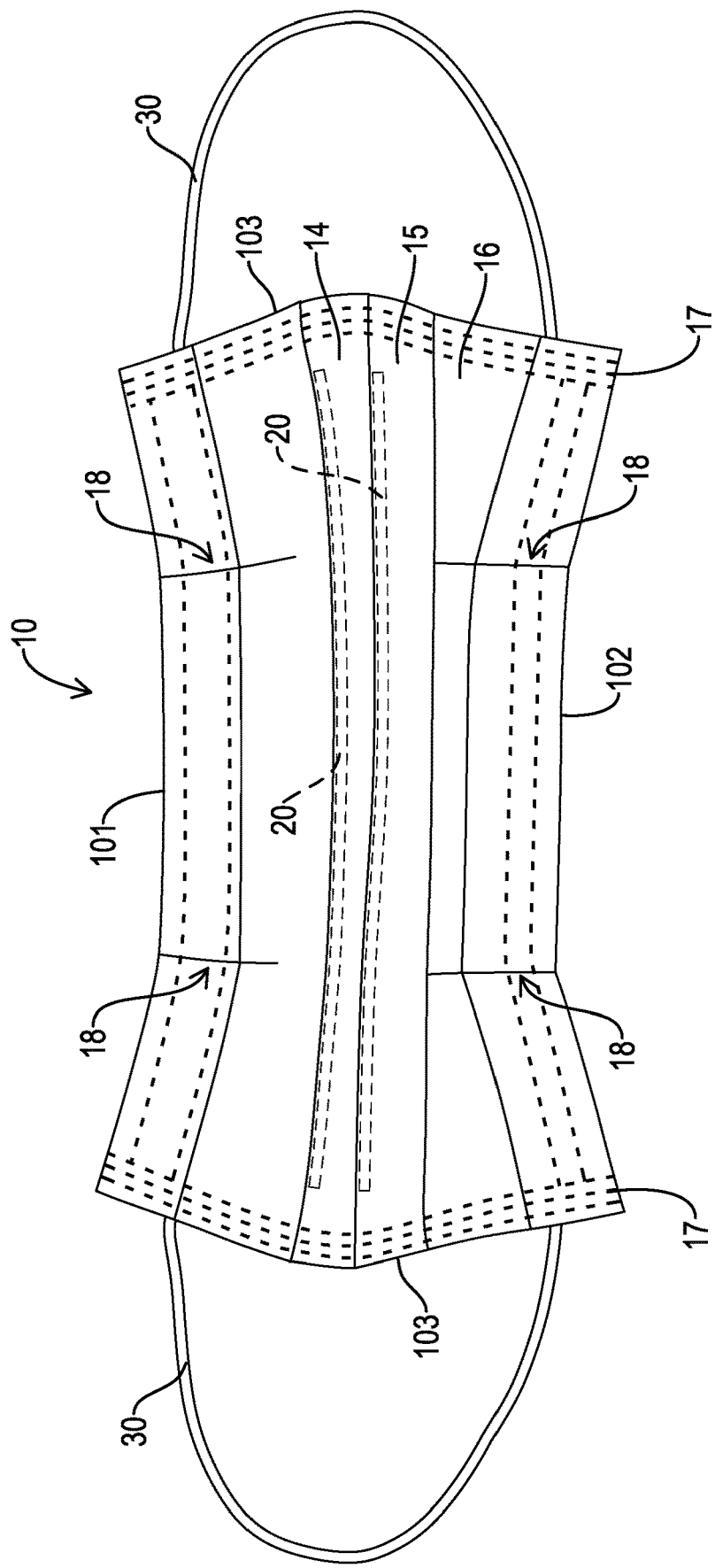
FIG. 9 is a top view of a fifth embodiment of the face mask in accordance with the present invention.
Figure 10:
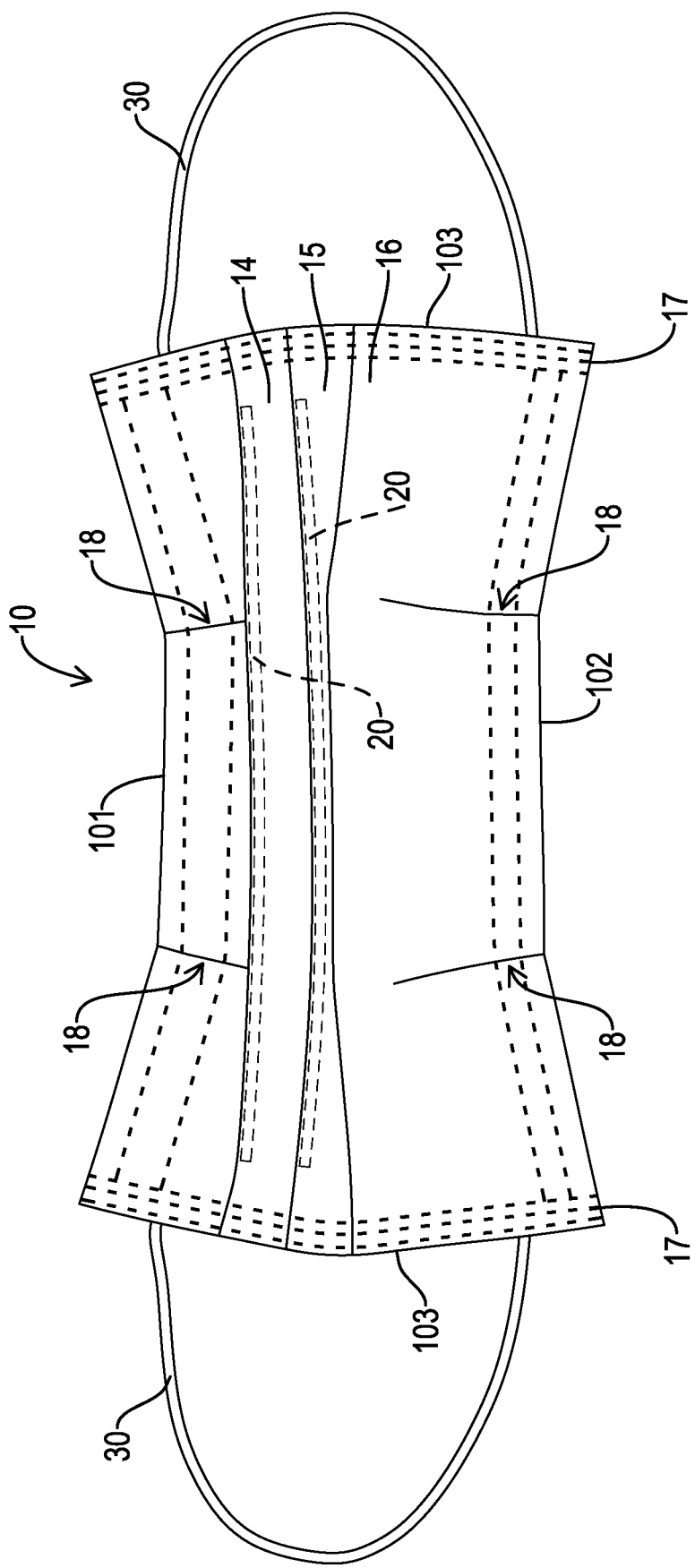
FIG. 10 is a bottom view of the fifth embodiment of the face mask in FIG. 9.
Figure 11:
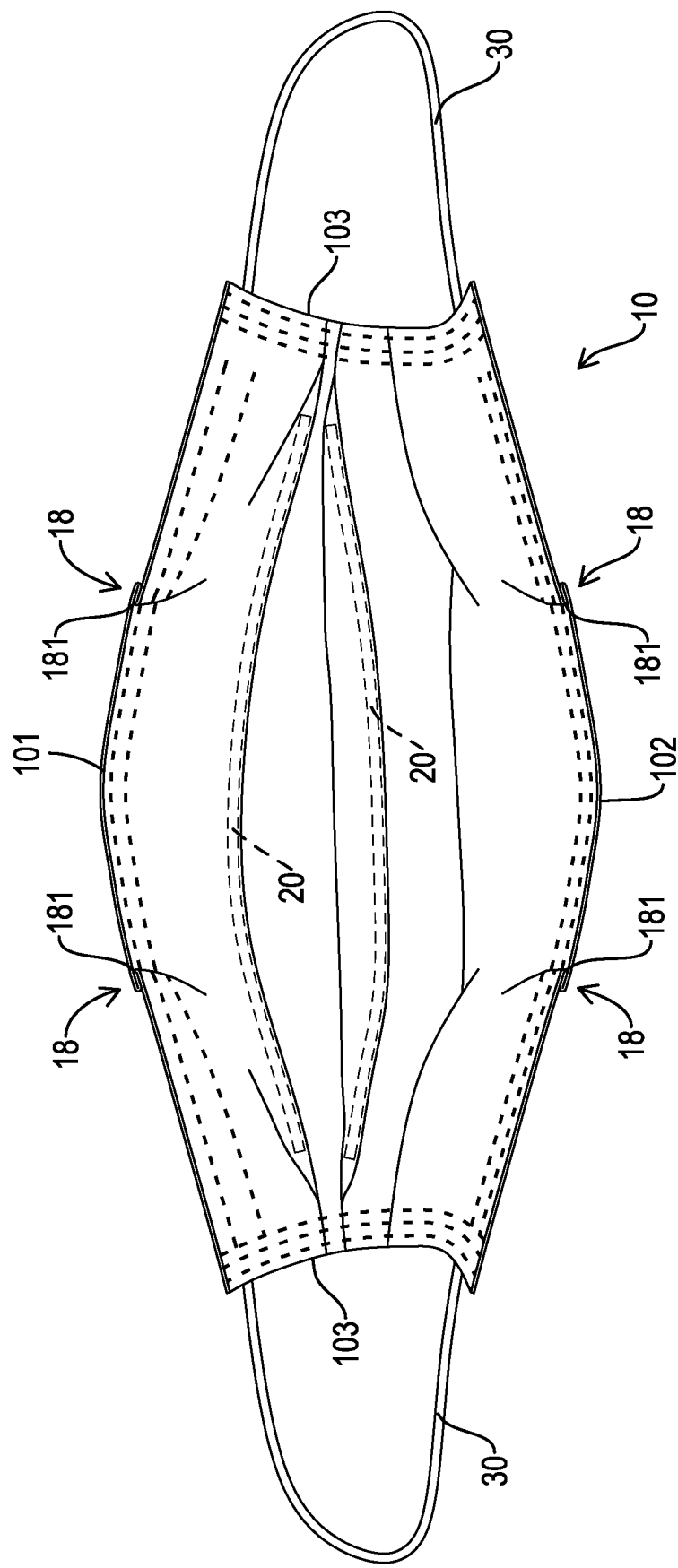
FIG. 11 is a perspective view of the fifth embodiment of the face mask in FIG. 9.

With reference to FIG. 9, the four fourth pleats 18 in the fifth embodiment facilitate the aforementioned first pleat 14, the second pleat 15, and the third pleat 16 to form the space between the mask body 10 and the wearer. When the face mask of the present invention is worn on the wearer's face, the four fourth pleats 18 make the face mask of the present invention more easily sustain its three-dimensional configuration. The four fourth pleats 18 especially make the face mask of the present invention stand in expansion between the columella of the wearer's nose and the upper lip of the wearer.

Figure 12:
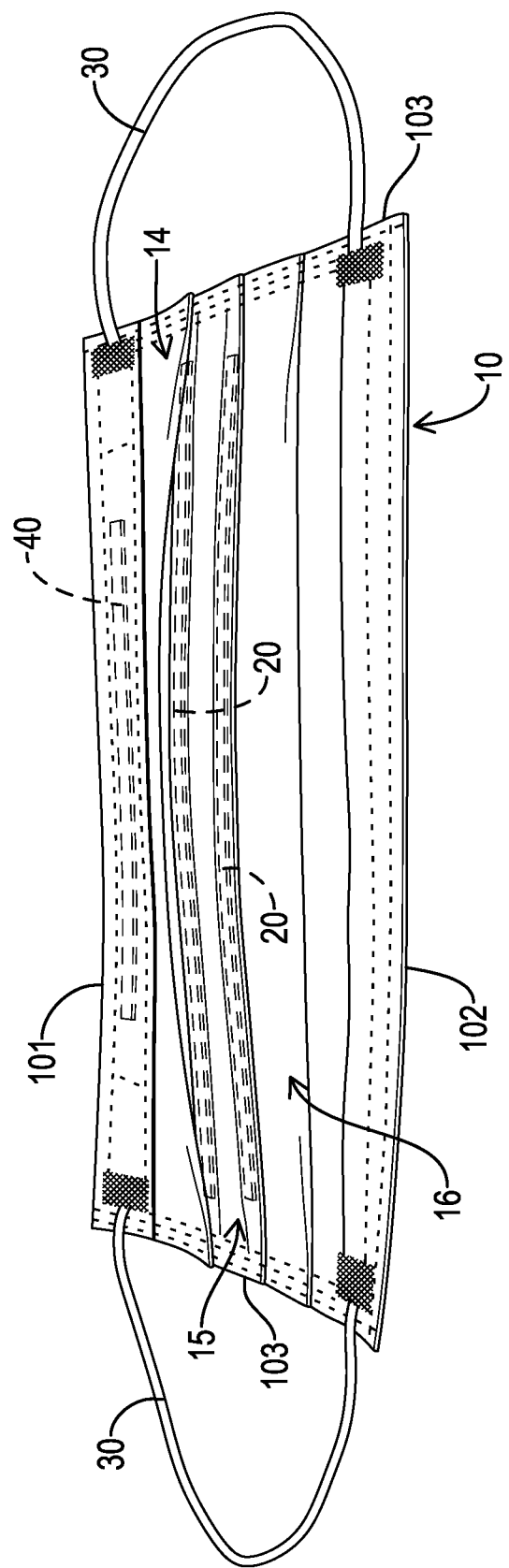
FIG. 12 is a perspective view of a sixth embodiment of the face mask in accordance with the present invention.
Figure 13:
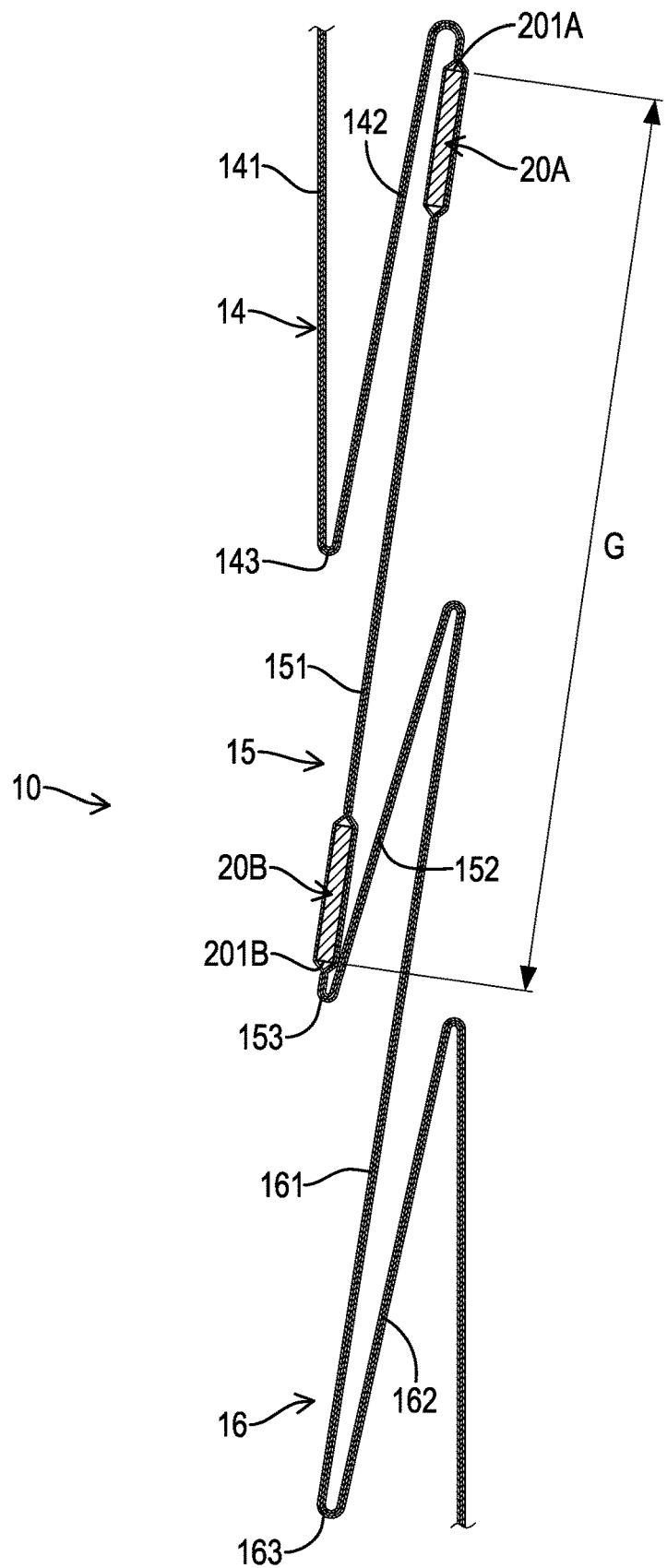
FIG. 13 is an enlarged cross-sectional side view of the face mask in FIG. 12.

With reference to FIGS. 12 and 13, a sixth embodiment of the present invention is also a flat face mask (surgical mask) and also has the mask body 10, the two supporting strips 20 disposed between the absorbent layer 11 and the filter layer 13, the two ear loops 30 respectively connected to the two lateral edges 103 of the mask body 10, and the nose clip 40. Differences between the sixth embodiment and the fourth embodiment are: the two supporting strips 20 are both disposed at the second pleat 15.

With reference to FIG. 13, each one of the first pleat 14, the second pleat 15, and the third pleat 16 has an exterior sheet, an interior sheet, and a bending section connected to both the exterior sheet and the interior sheet. Wherein, the first pleat 14 is disposed adjacent to the top edge 101 of the mask body 10. The third pleat 16 is disposed adjacent to the bottom edge 102 of the mask body 10. The second pleat 15 is disposed between the first pleat 14 and the third pleat 16. The exterior sheet 141 and the interior sheet 142 of the first pleat 14 are connected via the bending section 143 of the first pleat 14. The exterior sheet 151 and the interior sheet 152 of the second pleat 15 are connected via the bending section 153 of the second pleat 15. The exterior sheet 151 of the second pleat 15 connects to the interior sheet 142 of the first pleat 14 via a folded portion in a bending manner, and the interior sheet 142 of the first pleat 14 is between the exterior sheet 141 of the first pleat 14 and the exterior sheet 151 of the second pleat 15.

The exterior sheet 161 and the interior sheet 162 of the third pleat 16 are connected via the bending section 163 of the third pleat 16. The exterior sheet 161 of the third pleat 16 connects to the interior sheet 152 of the second pleat 15 via a folded portion in a bending manner, and the interior sheet 152 of the second pleat 15 is between the exterior sheet 151 of the second pleat 15 and the exterior sheet 161 of the third pleat 16.

Figure 14:
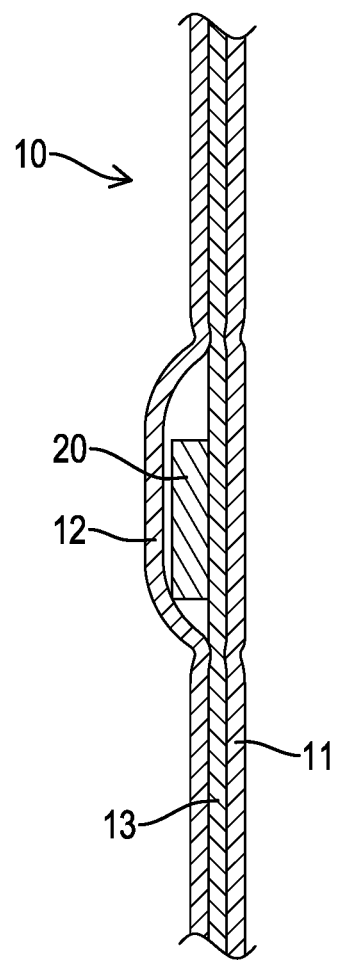
FIG. 14 is another enlarged cross-sectional side view of the face mask in FIG. 12.

With reference to FIG. 14, in the sixth embodiment, the nose clip 40 and the two supporting strips 20 are all disposed between the impermeable layer 12 and the filter layer 13. Practically, the nose clip 40 and the two supporting strips 20 may be disposed between the absorbent layer 11 and the filter layer 13. Or the two supporting strips 20 may be disposed at the absorbent layer 11 or at an outer surface of the impermeable layer 12.

With reference to FIGS. 12 and 13, the two supporting strips 20 are parallel to each other and are disposed at the exterior sheet 151 of the second pleat 15. In FIG. 13, one of the supporting strips 20 is defined as a first supporting strip 20A. The first supporting strip 20A is disposed adjacent to the folded portion connected between the interior sheet 142 of the first pleat 14 and the exterior sheet 151 of the second pleat 15. An outer edge 201A of the first supporting strip 20A is near to the folded portion connected between the interior sheet 142 of the first pleat 14 and the exterior sheet 151 of the second pleat 15.

The other one of the supporting strips 20 is defined as a second supporting strip 20B. The second supporting strip 20B is disposed adjacent to the bending section 153 of the second pleat 15. An outer edge 201B of the second supporting strip 20B is near to the bending section 153 of the second pleat 15. Specifically, a distance is defined between the top edge 101 of the mask body 10 and the outer edge 201A of the first supporting strip 20A, and the distance is larger than or equal to 2.6 centimeters (cm) and is smaller than or equal to 3.0 cm. Preferably, the distance between the top edge 101 of the mask body 10 and the outer edge 201A of the first supporting strip 20A is 2.8 cm.

A distance G is defined between the outer edge 201A of the first supporting strip 20A and the outer edge 201B of the second supporting strip 20B, and the distance G is larger than or equal to 2.3 cm and is smaller than or equal to 2.7 cm. Preferably, the distance G between the two outer edges 201A, 201B of the two supporting strips 20A, 20B is 2.5 cm.

Figure 15:
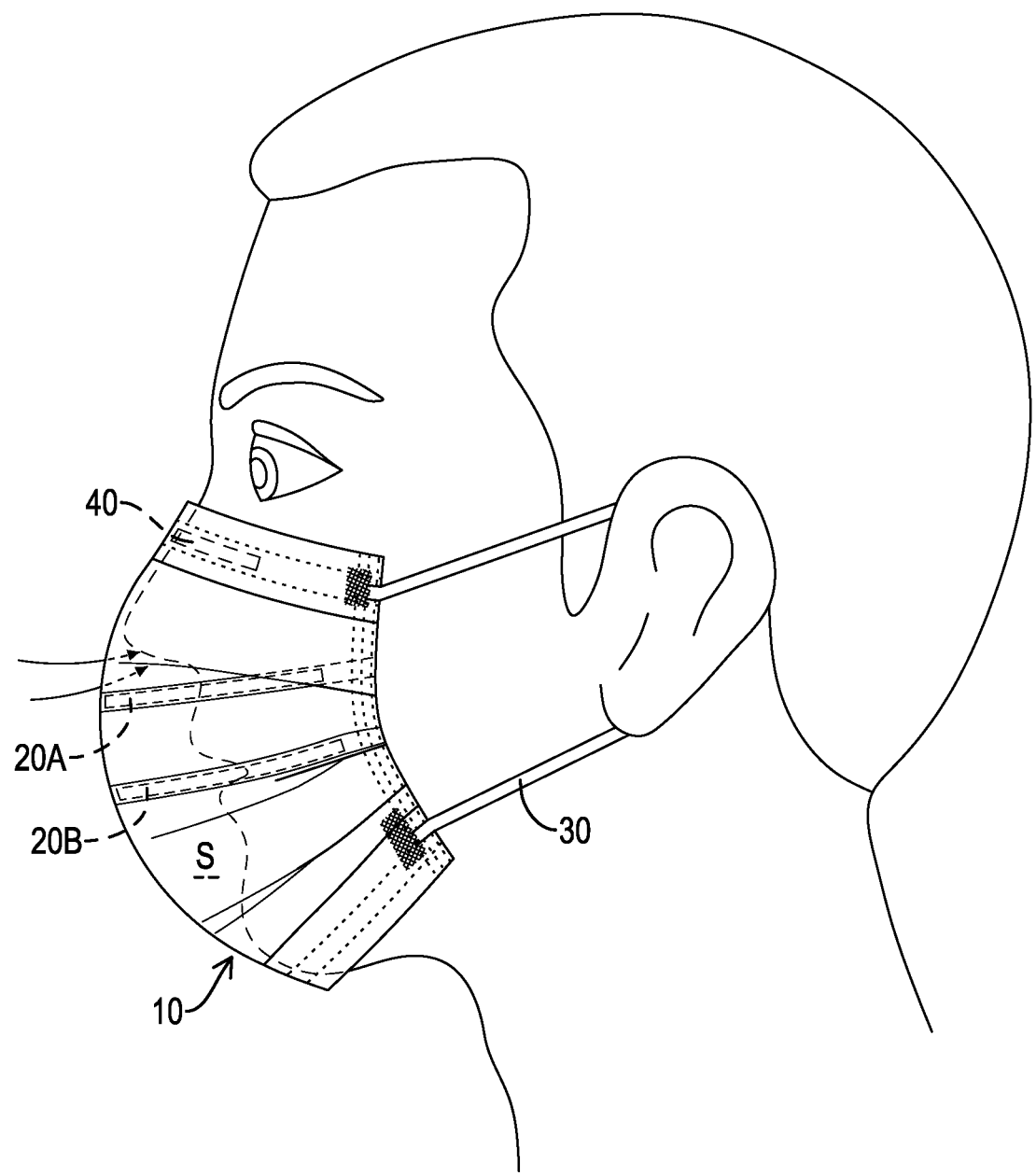
FIG. 15 is a side view of the face mask in FIG. 12 and shows the face mask worn on a wearer's face.
Figure 16:
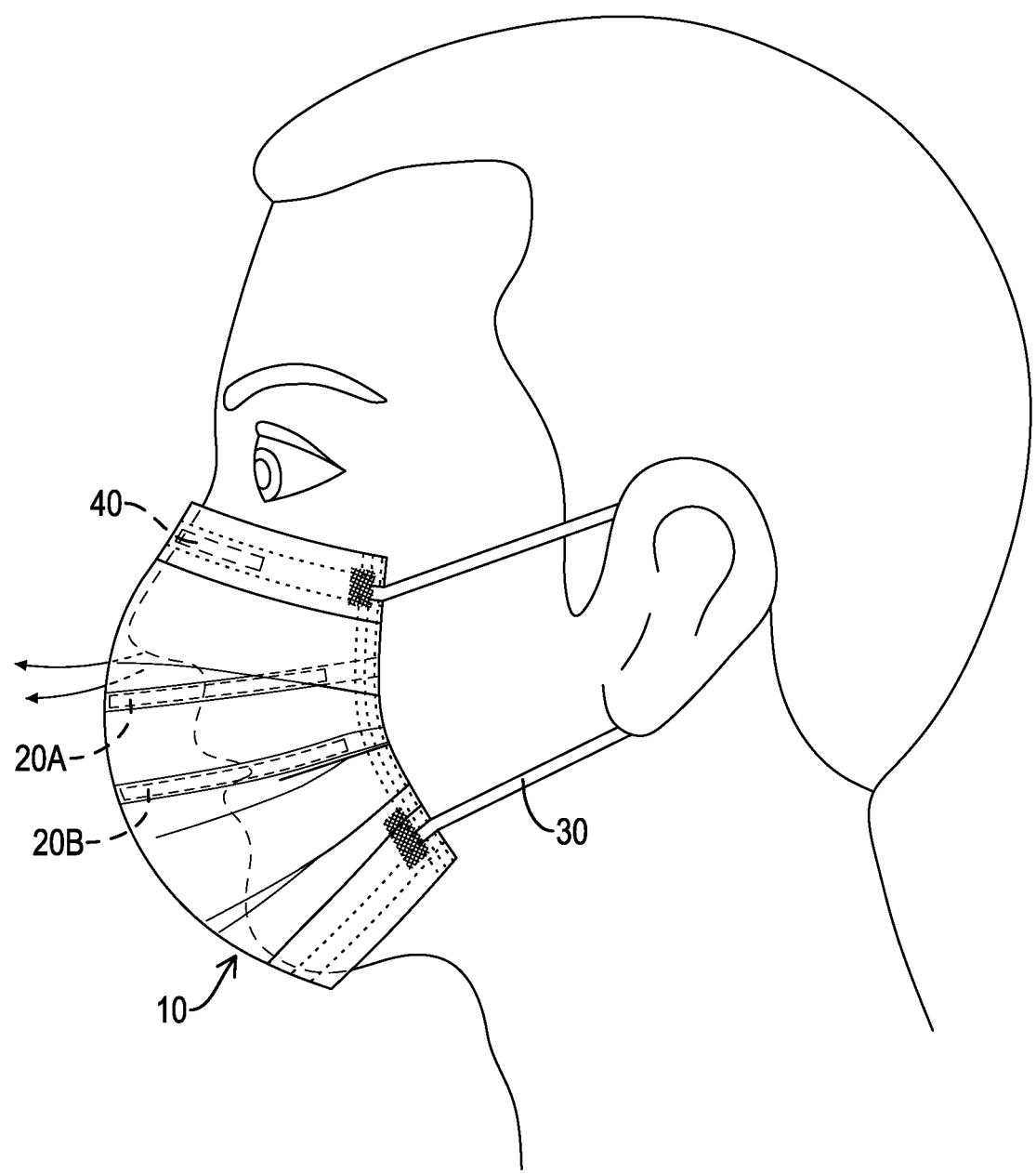
FIG. 16 is another side view of the face mask in FIG. 12 and shows the face mask worn on the wearer's face.

With reference to FIGS. 15 and 16, the first supporting strip 20A and the second supporting strip 20B with flexibility can be bended by the wearer to make the mask body 10 form the space S between the mask body 10 and the wearer. The wearer can adjust the degrees of bending of the first supporting strip 20A and the second supporting strip 20B to expand the space S and to ensure that the wearer breathes smoothly.

Especially, in the sixth embodiment, the first supporting strip 20A and the second supporting strip 20B are both disposed at a same pleat. A distance defined between the first supporting strip 20A and the second supporting strip 20B is short. A part of the mask body 10 disposed between the first supporting strip 20A and the second supporting strip 20B can be sufficiently supported, be expanded, and be free from collapsing. When the wearer speaks as wearing the face mask of the sixth embodiment, the part of the mask body 10 disposed between the first supporting strip 20A and the second supporting strip 20B is not easy to be depressed toward the wearer's face, and the face mask of the sixth embodiment shows a smooth appearance.

Moreover, the first supporting strip 20A is disposed adjacent to the folded portion connected between the interior sheet 142 of the first pleat 14 and the exterior sheet 151 of the second pleat 15, and the second supporting strip 20B is disposed adjacent to the bending section 153 of the second pleat 15. In other words, the first supporting strip 20A and the second supporting strip 20B are both disposed at the exterior sheet 151, which is flat, of the second pleat 15. In the sixth embodiment, the part of the mask body 10 disposed between the first supporting strip 20A and the second supporting strip 20B is free from any folding structures. Therefore, the part of the mask body 10 disposed between the first supporting strip 20A and the second supporting strip 20B is difficult to rise or be depressed when the wearer inhales, exhales, or speaks. The part of the mask body 10 disposed between the first supporting strip 20A and the second supporting strip 20B without any folding structures further keeps the exterior sheet 151 smooth when the face mask of the sixth embodiment is worn on the wearer's face.

Figure 17:
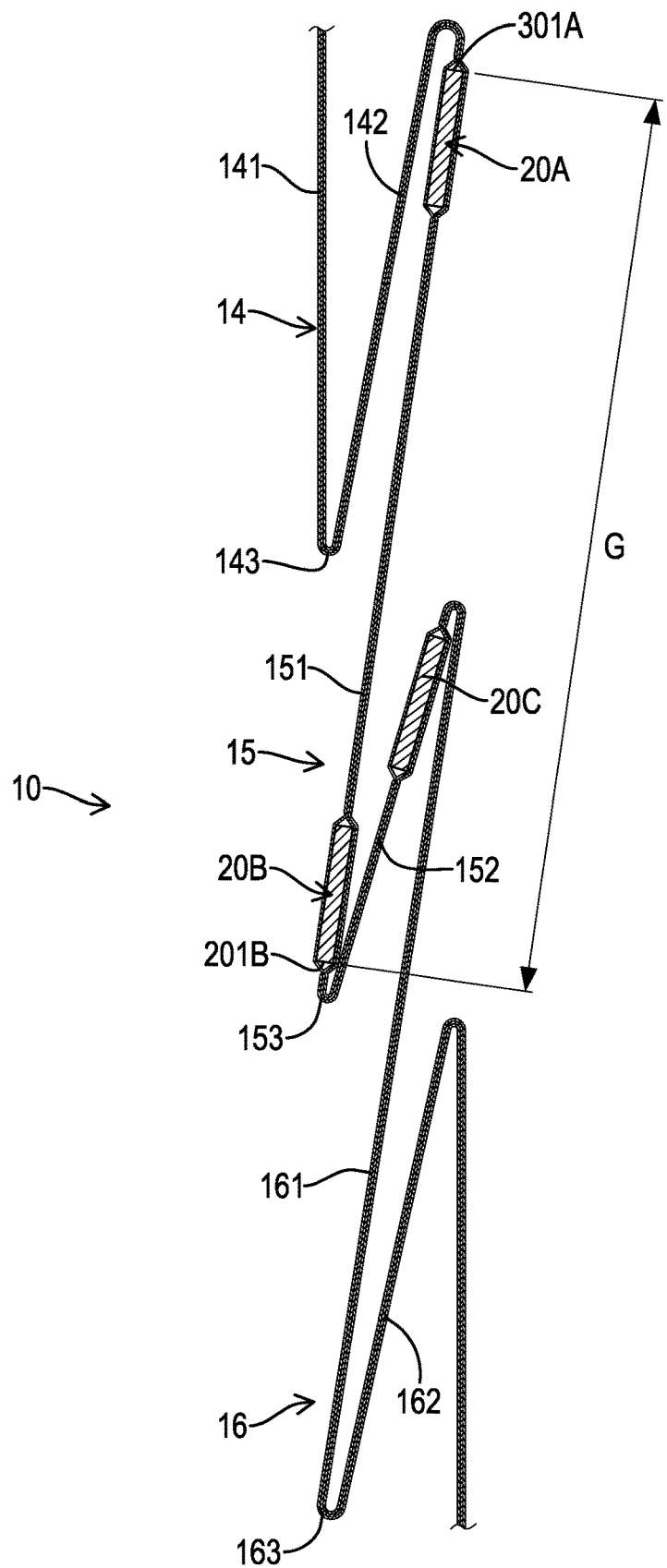
FIG. 17 is an enlarged cross-sectional side view of a seventh embodiment of the face mask in accordance with the present invention.

With reference to FIG. 17, a seventh embodiment is similar to the sixth embodiment. Difference between the seventh embodiment and the sixth embodiment is that the face mask of the seventh embodiment further has a third supporting strip 20C. In the seventh embodiment, the first supporting strip 20A and the second supporting strip 20B are still disposed at the exterior sheet 151 of the second pleat 15, and the third supporting strip 20C is disposed at the interior sheet 152 of the second pleat 15. Same as the sixth embodiment, the first supporting strip 20A is disposed adjacent to the folded portion connected between the interior sheet 142 of the first pleat 14 and the exterior sheet 151 of the second pleat 15, and the second supporting strip 20B is disposed adjacent to the bending section 153 of the second pleat 15. In the seventh embodiment, the third supporting strip 20C is disposed at the interior sheet 152 of the second pleat 15 and is disposed adjacent to the folded portion connected between the interior sheet 152 of the second pleat 15 and the exterior sheet 161 of the third pleat 16.

With reference to FIG. 17, the third supporting strip 20C in the seventh embodiment is also disposed at the second pleat 15. The first supporting strip 20A is disposed between a lower rim of the wearer's nose and the upper lip of the wearer. The second supporting strip 20B is disposed between the upper lip and the lower lip of the wearer. The third supporting strip 20C is disposed between the lower lip and the chin of the wearer and further enhances rigidity of the second pleat 15. When the face mask of the seventh embodiment is worn on the wearer's face, the third supporting strip 20C makes the second pleat 15 of the mask body 10 even stiffer. Practically, the third supporting strip 20C may be disposed at the interior sheet 152 of the second pleat 15, be disposed adjacent to the bending section 153, and be disposed between the impermeable layer 12 and the filter layer 13.

Figure 18:
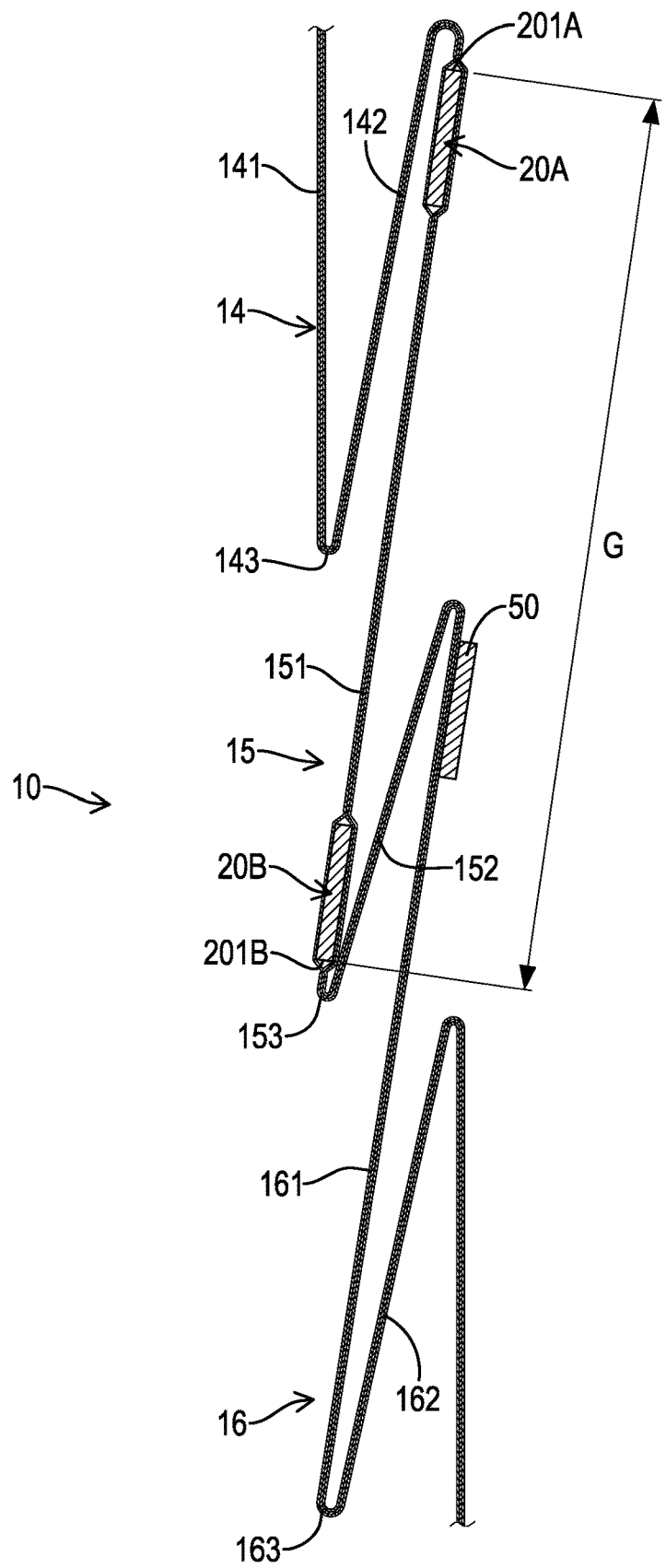
FIG. 18 is an enlarged cross-sectional side view of an eighth embodiment of the face mask in accordance with the present invention.
Figure 19:
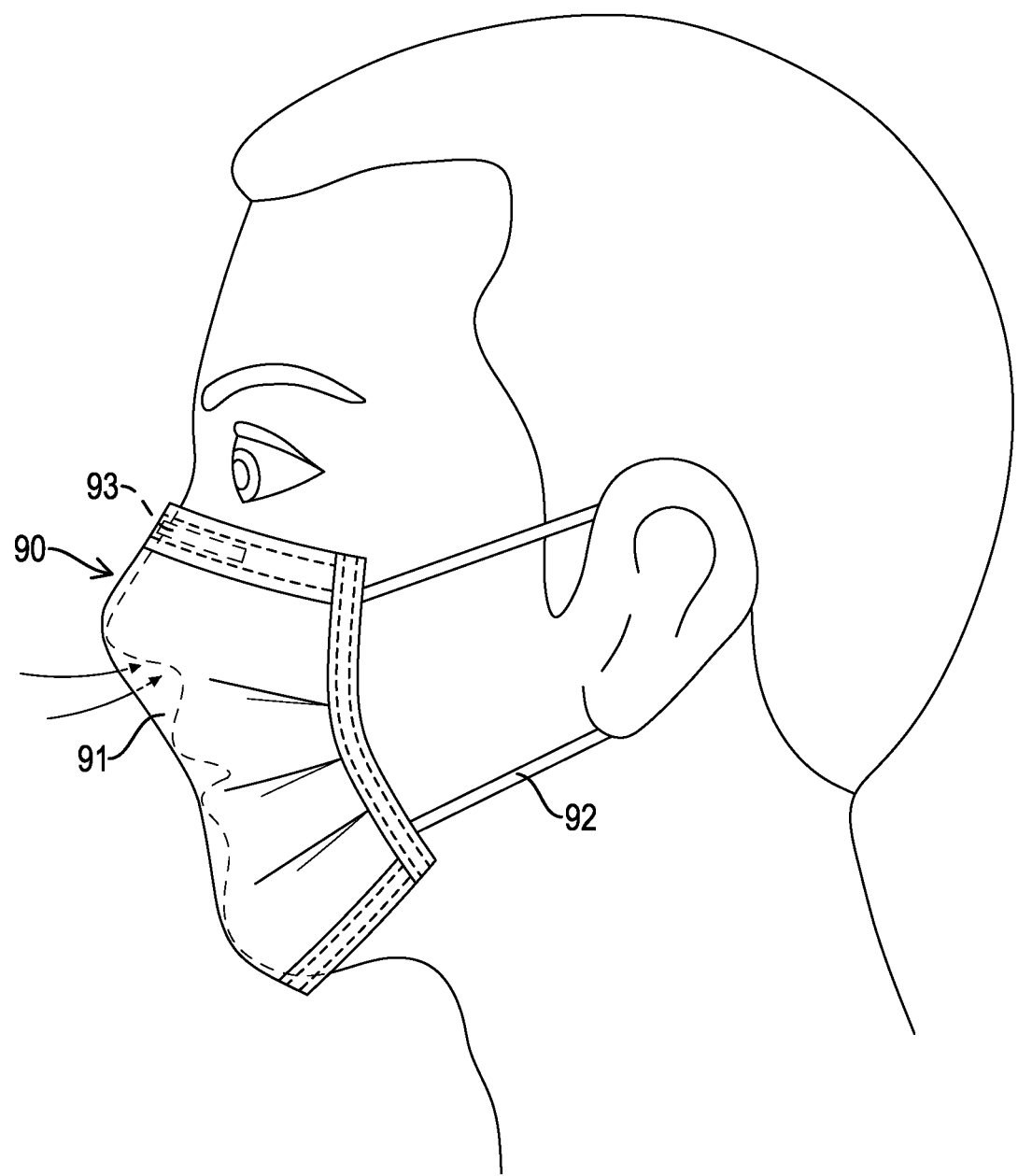
FIG. 19 is a side view of a conventional face mask and shows the face mask worn on the wearer's face.

With reference to FIG. 18, an eighth embodiment is similar to the seventh embodiment. Difference between the eighth embodiment and the seventh embodiment is that the eighth embodiment omits the third supporting strip 20C disposed adjacent to the folded portion connected to the interior sheet 152 of the second pleat 15 and the exterior sheet 161 of the third pleat 16. In the eighth embodiment, the present invention further has an auxiliary strip 50 being elongated and flexible. The auxiliary strip 50 is parallel to the first supporting strip 20A and the second supporting strip 20B and extends toward the two lateral edges 103. The auxiliary strip 50 is directly attached to the absorbent layer 11 and is disposed adjacent to the folded portion connected to the exterior sheet 161 of the third pleat 16 and the interior sheet 152 of the second pleat 15. The auxiliary strip 50 may be disposed between the impermeable layer 12 and the filter layer 13 as in the sixth embodiment.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A face mask comprising:
  a mask body having a top edge and a bottom edge disposed opposite each other, and having two lateral edges disposed opposite each other;
  multiple supporting strips, each supporting strip being elongated, being bendable, disposed at a middle position on the mask body, and extending toward the two lateral edges; and
  two ear loops respectively connected to the two lateral edges of the mask body;
  wherein the mask body has a first pleat, a second pleat, and a third pleat parallel to one another at intervals;
  the first pleat is disposed adjacent to the top edge of the mask body;
  the third pleat is disposed adjacent to the bottom edge of the mask body;
  the second pleat is disposed between the first pleat and the third pleat; and
  the multiple supporting strips are disposed at intervals and are disposed at the second pleat;
  the first pleat has an exterior sheet, an interior sheet, and a bending section connecting the exterior sheet and the interior sheet of the first pleat;
  the second pleat has an exterior sheet, an interior sheet, and a bending section connecting the exterior sheet and the interior sheet of the second pleat;
  the third pleat has an exterior sheet, an interior sheet, and a bending section connecting the exterior sheet and the interior sheet of the third pleat;
  all the bending sections of the first pleat and the second pleat exteriorly extend toward the bottom edge of the mask body;
  the exterior sheet of the second pleat is connected to the interior sheet of the first pleat via a folded portion in a bending manner, and the interior sheet of the first pleat is disposed between the exterior sheet of the first pleat and the exterior sheet of the second pleat;
  the exterior sheet of the third pleat is connected to the interior sheet of the second pleat via a folded portion in a bending manner, and the interior sheet of the second pleat is disposed between the exterior sheet of the second pleat and the exterior sheet of the third pleat;
  all the folded portions interiorly extend toward the top edge of the mask body;
  the multiple supporting strips include two supporting strips; and
  one of the two supporting strips is disposed immediately adjacent to the folded portion connected between the exterior sheet of the second pleat and the interior sheet of the first pleat, and the other one of the two supporting strips is disposed immediately adjacent to the bending section of the second pleat such that there is no fold or bend between the two supporting strips;
  the exterior sheets and the interior sheets of the first pleat and the second pleat integrally form the mask body.

2. The face mask as claimed in claim 1, wherein
  a distance is defined between two outer edges of the two supporting strips; and
  the distance between the two outer edges of the two supporting strips is larger than or equal to 2.3 centimeters (cm) and is smaller than or equal to 2.7 cm.

3. The face mask as claimed in claim 2, wherein a distance defined between the top edge of the mask body and the outer edge of one of said two supporting strips that is disposed adjacent to the top edge of the mask body is larger than or equal to 2.6 cm and is smaller than or equal to 3.0 cm.

4. The face mask as claimed in claim 1, wherein the face mask has two securements respectively extending along the two lateral edges of the mask body.

5. The face mask as claimed in claim 4, wherein each supporting strip has two opposite ends respectively apart from the two securements.

6. The face mask as claimed in claim 1, wherein
  the mask body has an absorbent layer, an impermeable layer, and a filter layer disposed between the absorbent layer and the impermeable layer; and
  the two supporting strips are disposed between the absorbent layer and the filter layer.

7. The face mask as claimed in claim 6, wherein the absorbent layer, the impermeable layer, the filter layer, and the two supporting strips are welded.

8. The face mask as claimed in claim 1, wherein
  the mask body has an absorbent layer, an impermeable layer, a filter layer;
  the filter layer is disposed between the absorbent layer and the impermeable layer.

9. The face mask as claimed in claim 1, wherein
the face mask further has an auxiliary strip being elongated, being flexible, extending toward the two lateral edges of the mask body, and disposed adjacent to the folded portion connected between the exterior sheet of the third pleat and the interior sheet of the second pleat.

10. The face mask as claimed in claim 1, wherein the multiple supporting strips further include
an additional said supporting strip; and
the two supporting strips are disposed on the exterior sheet of the second pleat; and
the additional said supporting strip is disposed at the interior sheet of the second pleat and is disposed adjacent to the folded portion connected between the interior sheet of the second pleat and the exterior sheet of the third pleat.

\* \* \* \* \*